United States Patent [19]

Ito et al.

[11] Patent Number: 4,679,808
[45] Date of Patent: Jul. 14, 1987

[54] VEHICLE MOTION ESTIMATING SYSTEM

[75] Inventors: Ken Ito, Yokohama; Taketoshi Kawabe, Tokyo, both of Japan

[73] Assignee: Nissan Motor Co., Ltd., Japan

[21] Appl. No.: 837,170

[22] Filed: Mar. 7, 1986

[30] Foreign Application Priority Data

Mar. 15, 1985 [JP] Japan .................................. 60-50553

[51] Int. Cl.⁴ ............................................. B62D 6/00
[52] U.S. Cl. ...................................... 280/91; 364/424
[58] Field of Search ............... 180/141, 142, 143, 140, 180/132; 280/91; 364/424, 425; 318/580, 585, 586, 587

[56] References Cited

U.S. PATENT DOCUMENTS

| | | | |
|---|---|---|---|
| 3,011,579 | 12/1961 | Milliken | 180/142 |
| 3,866,706 | 2/1975 | Lincke et al. | 180/142 |
| 3,897,846 | 8/1975 | Inoue | 180/142 |
| 3,958,656 | 5/1976 | Niemann | 180/142 |
| 4,092,716 | 5/1978 | Berg et al. | 318/580 |
| 4,094,479 | 6/1978 | Kennedy | 318/586 |
| 4,418,780 | 12/1983 | Ito et al. | 180/142 |
| 4,441,572 | 4/1984 | Ito et al. | 180/143 |

FOREIGN PATENT DOCUMENTS 79754   6/1980   Japan ................................... 180/142

Primary Examiner—John J. Love
Assistant Examiner—Karin L. Ferriter
Attorney, Agent, or Firm—Leydig, Voit & Mayer

[57] ABSTRACT

A system for estimating the state of a controlled vehicle's motion has a steering wheel angle sensor, a vehicle speed sensor, a sensor for sensing a first motion variable such as a yaw rate, a sensor for sensing a second motion variable such as a yaw acceleration, and a processing unit such as a microcomputer. In accordance with the sensor output signals, the processing unit produces a condition signal which is in a first signal state when the unit determines that the vehicle is in a steady-state turning motion, and in a second signal state when the unit determines that the vehicle is in a transient state turning motion. The processing unit determines estimated values of the first and second motion variables corresponding to the steering wheel angle and vehicle speed by solving a first predetermined mathematical vehicle model, and further determines an estimated value of a third motion variable such as slip angle or steer angle by solving a second mathematical vehicle model which may be identical to or different from the first model. The processing unit adjusts a value of a vehicle characterizing parameter such as a cornering power of the second model in accordance with the result of comparison between the sensed and estimated values of the first motion variable when the condition signal is in the first state, and in accordance with the result of comparison between the sensed and estimated value of the second motion variable when the condition signal is in the second state.

13 Claims, 12 Drawing Figures

VEHICLE MOTION ESTIMATING SYSTEM

CROSS REFERENCES TO RELATED APPLICATIONS

Co-pending application Ser. No. 773,650 relates to hydraulic steering units and steering regulators and is referred to in the present application.

BACKGROUND OF THE INVENTION

The present invention relates to a vehicle motion estimating system for determining estimated values of one or more vehicle motion variables corresponding to sensed values of steering wheel angle and vehicle speed by using a predetermined mathematical vehicle model.

Yaw rate and lateral acceleration are vehicle motion variables which are easy to sense. However, recent advances in automotive electronics increase the demand for sensors for sensing various other vehicle motion variables which are difficult or impossible to sense.

SUMMARY OF THE INVENTION

It is an object of the present invention to provide a vehicle motion estimating system which can estimate actual values of the vehicle motion variables accurately instead of sensing them directly.

It is another object of the present invention to provide a steering control system which can accurately determine a front wheel steer angle and/or a rear wheel steer angle which are required to control a vehicle so as to provide the vehicle with desired cornering characteristics.

A system of the present invention comprises a means for sensing a steering wheel angle of a controlled vehicle and determining an actual value of the steering wheel angle, a means for sensing a vehicle speed of the controlled vehicle and determining an actual value of the vehicle speed, a means for sensing a first motion variable such as yaw rate of the controlled vehicle and determining an actual value of the first motion variable, a means for sensing a second motion variable such as a yaw acceleration of the controlled vehicle and determining its actual value, and a processing means such a microcomputer connected with all the sensing means for estimating at least a third variable which defines the motion of the controlled vehicle. The processing means comprises a state discriminating means, a motion estimating means, and a parameter adjusting means. The state discriminating means produces a condition signal which is in a first signal state when the controlled vehicle is in a steady-state turning motion and in a second signal state when the controlled vehicle is in a transient state turning motion. The motion estimating means determines estimated values of the first, second and third variables corresponding to the actual values of the steering wheel angle and vehicle speed by using at least a first mathematical vehicle model which is determined by equations of motion and values of a group of vehicle characterizing parameters including at least a first vehicle characterizing parameter. The parameter adjusting means adjusts the value of the first vehicle characterizing parameter used in determining the estimated value of the third variable in accordance with a result of a comparison between the actual and estimated value of the first motion variable when the condition signal is in the first state and in accordance with a result of a comparison between the actual and estimated values of the second motion variable when the condition signal is in the second state.

DETAILED DESCRIPTION OF THE INVENTION

Figure 1:
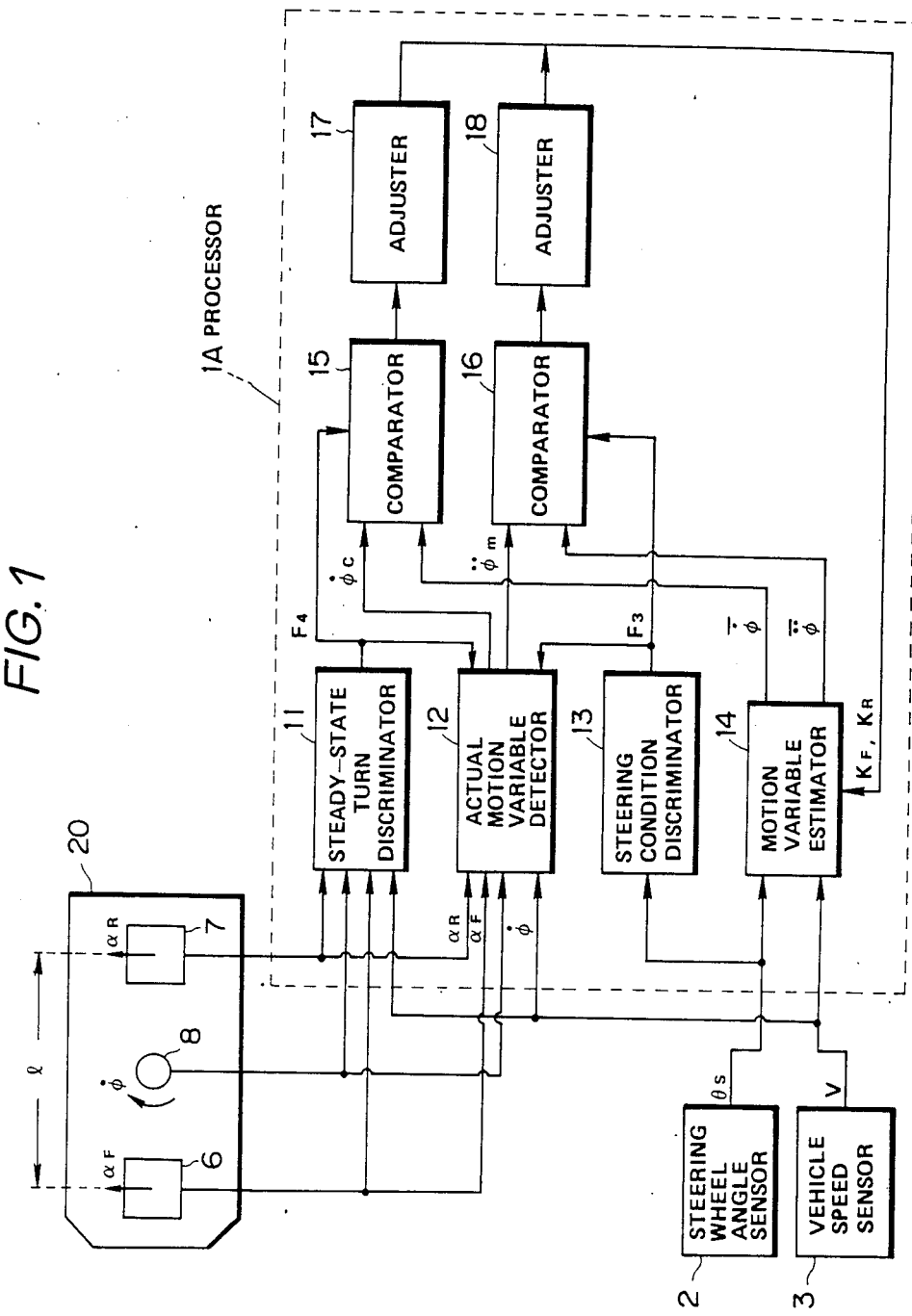
FIG. 1 is a block diagram showing a first embodiment of the invention.

A first embodiment of the present invention is shown in FIG. 1. A system of the first embodiment has a data processor 1A which takes the form of a microcomputer or other electric circuits. In FIG. 1, the internal structure of the processor 1A is shown by means of functional blocks.

Front and rear acceleration sensors 6 and 7 and a yaw rate sensor 8 are mounted on a controlled vehicle 20 equipped with the system of the present invention. The front acceleration sensor 6 is disposed on an axial line of a front axle in the middle between right and left front wheels, and the rear acceleration sensor 7 is disposed on an axial line of a rear axle in the middle between right and left rear wheels. The yaw rate sensor 8 is disposed at a center of gravity of the vehicle body. The front and rear acceleration sensors 6 and 7 sense a lateral acceleration $\alpha_F$ of the front wheels and a lateral acceleration $\alpha_R$ of the rear wheels, respectively. The yaw rate sensor 8 senses a yaw rate $\dot{\phi}$ of the controlled vehicle 20.

The system further has a steering wheel angle sensor 2 for sensing a steering input quantity such as an angle $\theta_s$ of a steering wheel of the vehicle 20, and a vehicle speed sensor 3 for sensing a vehicle speed V of the vehicle 20.

As shown in FIG. 1, the processor 1A is functionally divided into eight sections; a steady-state turn discriminator section 11, an actual motion variable detector section 12, a steering condition discriminator section 13, a motion variable estimator section 14, two comparator sections 15 and 16, and two parameter adjuster sections 17 and 18.

The steady-state turn discriminator section 11 receives the front wheel lateral acceleration $\alpha_F$ sensed by the front acceleration sensor 6, the rear wheel lateral acceleration $\alpha_R$ sensed by the rear acceleration sensor 7, the yaw rate $\dot{\phi}$ sensed by the yaw rate sensor 8, and the vehicle speed V sensed by the vehicle speed sensor 3. By using these input signals, the steady-state turn discriminator section 11 determines whether the controlled vehicle 20 is in a steady-state turning motion or not, and produces a signal $F_4$ in accordance with the result of the determination.

The steering condition discriminator section 13 receives the steering wheel angle $\theta_s$ sensed by the steering wheel angle sensor 2, and determines whether the controlled vehicle 20 is in a transient state that exists when a change in the steering wheel angle has brought a rectilinear motion of the vehicle on an end, but a new steady-state turning motion has not yet been reached. In accordance with the result of the determination, the steering condition discriminator section 13 produces a signal $F_3$.

The actual motion variable detector section 12 determines an actual yaw rate $\dot{\phi}_c$ when the signal $F_4$ indicates that the controlled vehicle 20 is in the steady-state turning motion, and determines an actual yaw acceleration $\ddot{\phi}_m$ when the signal $F_3$ indicates that the controlled vehicle 20 is in the transient state.

The motion variable estimator section 14 determines estimated values of vehicle motion variables corresponding to the steering wheel angle $\theta_s$ and the vehicle speed V by performing mathematical operations according to a predetermined actual vehicle model which is determined by equations of vehicle motion and values of vehicle characterizing parameters. The motion variable estimator section 14 determined an estimated yaw rate value $\dot{\phi}$, and an estimated yaw acceleration $\ddot{\phi}$. Additionally, the estimator section 14 determines estimated values of one or more other motion variables such as a slip angle of a center of gravity of a vehicle body, a front wheel slip angle, a rear wheel slip angle, a front wheel cornering force, a rear wheel cornering force and/or a vehicle roll angle.

The comparator section 15 compares the actual yaw rate value $\dot{\phi}_c$ with the estimated yaw rate value $\dot{\phi}$. The comparator section 16 compares the actual yaw acceleration value $\ddot{\phi}_m$ with the estimated yaw acceleration value $\ddot{\phi}$.

The adjuster section 17 adjusts values of a front wheel cornering power parameter $K_F$ and a rear wheel cornering power parameter $K_R$ used in the motion variable estimator section 14 in accordance with the result of the comparison of the comparator section 15. The adjuster section 18 adjusts the values of the cornering power parameters $K_F$ and $K_R$ in accordance with the result of the comparison of the comparator section 16.

When the processor 1A is a microcomputer, it performs programs shown in FIGS. 2, 4–6, 7A and 7B.

Figure 2:
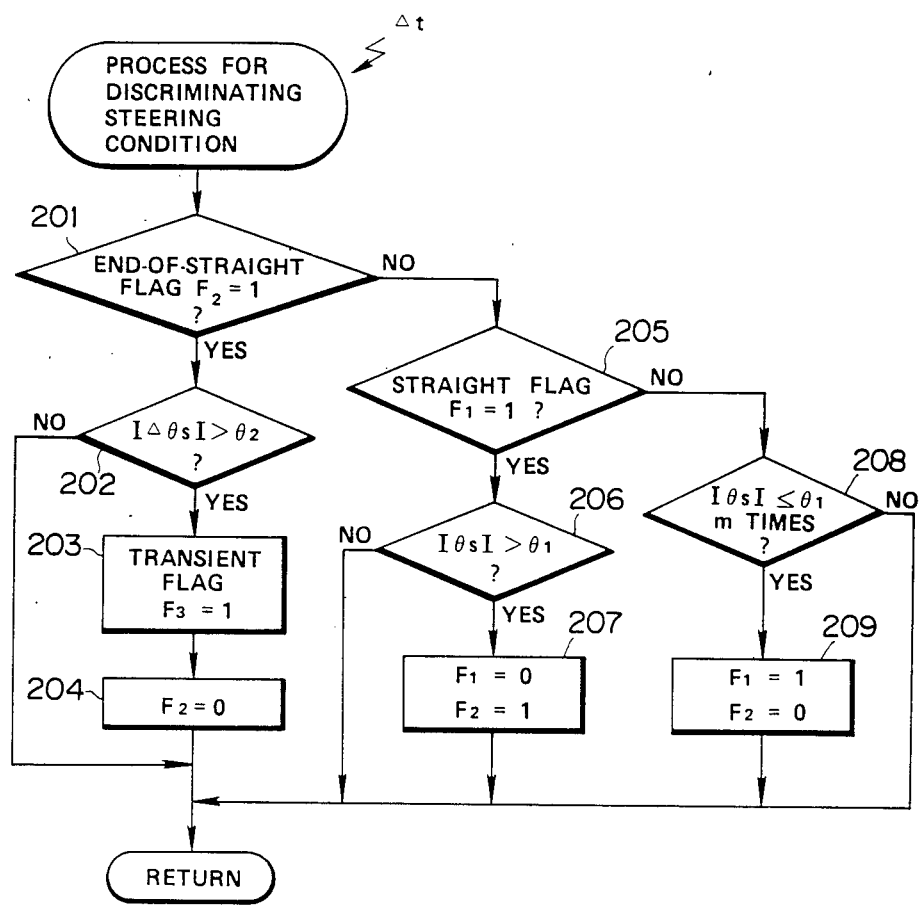
FIG. 2 is a flowchart of a program performed by a processor of the first embodiment.

A steering condition discriminating process shown in FIG. 2 corresponds to the steering condition discriminator section 13 of the processor 1A.

The processor 1A reads the steering wheel angle $\theta_s$ at regular time intervals of a period $\Delta t$, to monitor change in the steering wheel angle, and determines whether the vehicle is in a rectilinear motion, or the vehicle starts a turning motion, or the vehicle is in a transient state between a start of a turning motion and a start of a steady-state turning motion. The processor 1A sets a straight motion flag $F_1$ if the vehicle is in a rectilinear motion, and end-of-straight-motion flag $F_2$ if the vehicle starts a turning motion, and a transient motion flag $F_3$ corresponding to the above-mentioned signal $F_3$ if the vehicle is in a transient motion.

Figure 3:
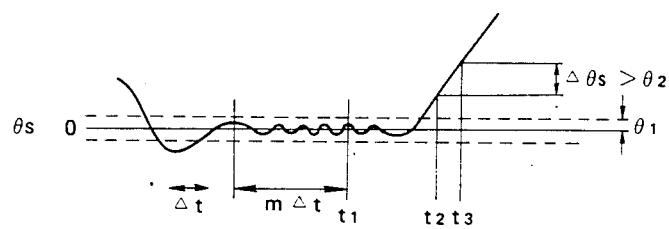
FIG. 3 is a timing chart showing variation of a steering wheel angle for explaining the process of FIG. 2.

If the steering wheel angle $\theta_s$ varies as shown in FIG. 3 by way of example, and all the flags $F_1$, $F_2$ and $F_3$ are reset in an initial state, then the processor 1A reads the steering wheel angle $\theta_s$ sensed by the steering wheel angle sensor 2, and executes instructions of a step 208 each time the period $\Delta t$ has elapsed. At the step 208, the processor 1A determines whether the absolute value of the steering wheel angle $\theta_s$ is equal to or smaller than a predetermined first angle $\theta_1$ which is a limit bounding a range of the rectilinear motion. It is possible to consider that the vehicle is in a rectilinear motion if the steering wheel angle $\theta_s$ is fluctuating on both sides of a neutral point (at which $\theta_s=0$) within a narrow range. In this embodiment, the processor 1A sets the straight motion flag $F_1$ at a step 209 if an affirmative answer that $|\theta_s| \leq \theta_1$ is obtained m times consecutively at the step 208. In FIG. 3, the flag $F_1$ is set to one at an instant $t_1$.

If the driver turns the steering wheel and the absolute value of the steering wheel angle $\theta_s$ exceeds the first angle $\theta_1$, then the answer of a step 206 becomes affirmative, and the end-of-straight-motion flag $F_2$ is set to one at a step 207. In FIG. 3, the flag $F_2$ is set at an instant $t_2$.

Then, the processor 1A proceeds to a step 202 and determines whether the absolute value of a variation $\Delta\theta_s$ during one cycle of the period $\Delta t$ is greater than a second predetermined angle $\theta_2$. The variation $\Delta\theta_s$ is the change in the steering wheel angle $\theta$ during one cycle. If $|\Delta\theta_s| > \theta_2$, then the processor 1A concludes that the vehicle is in the transient state motion, and sets the transient state motion flag $F_3$ to one at a step 203. In FIG. 3, the flag $F_3$ is set at an instant $t_3$.

Figure 4:
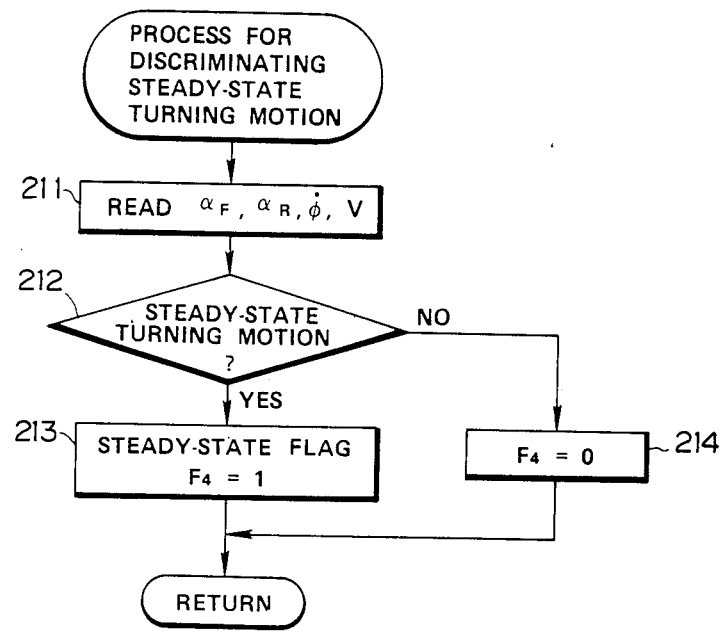
FIGS. 4, 5, 6, 7A and 7B are flowcharts of programs performed by the processor shown in FIG. 1.

A steady-state turning motion discriminating process shown in FIG. 4 corresponds to the steady-state turn discriminator section 11 of the processor 1A. The processor 1A reads the front wheel lateral acceleration $\alpha_F$ sensed by the sensor 6, the rear wheel lateral acceleration $\alpha_R$ sensed by the sensor 7, the yaw rate $\dot{\phi}$ sensed by the sensor 8, and the vehicle speed V sensed by the sensor 3 at a step 211, and determines from these input data whether the controlled vehicle 20 is in a steady-state turning motion or not at a step 212. If the processor 1A concludes that the controlled vehicle 20 is in the steady-state turning motion, then the processor 1A sets the steady state motion flag $F_4$ to one at a step 213. If the processor 1A reaches the opposite conclusion, then it resets the flag $F_4$ to zero at a step 214.

Figure 5:
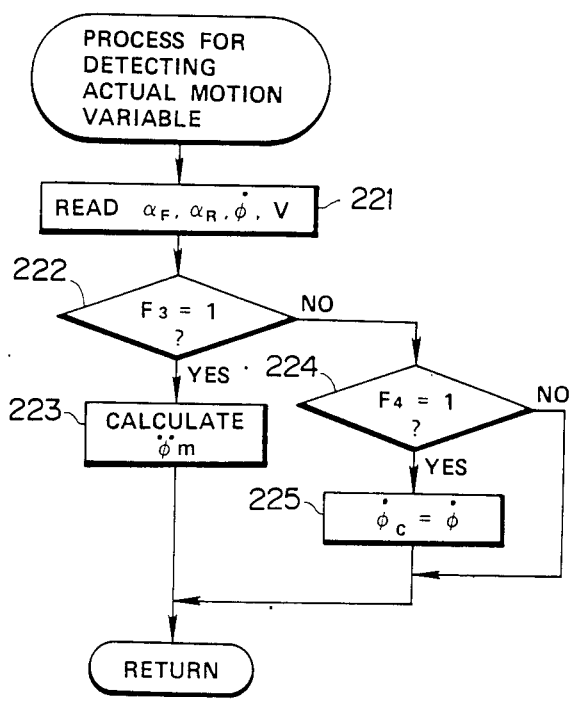

An actual motion variable detecting process shown in FIG. 5 corresponds to the actual motion variable detector section 12 of the processor 1A.

When the transient state motion flag $F_3$ is in its set state, the processor 1A proceeds to a step 223, and determines the actual yaw acceleration value $\ddot{\phi}_m$ from $\alpha_F$ and $\alpha_R$ by using the following equation (1);

$$\ddot{\phi}_m = \frac{\alpha_F - \alpha_R}{l} \tag{1}$$

where $l$ is a wheelbase of the controlled vehicle 20.

The yaw acceleration varies predominantly in the transient state motion of the vehicle. Besides, it is possible to determine the yaw acceleration very accurately by sensing the front wheel and rear wheel lateral accelerations and performing the simple mathematical operation.

When the steady motion flag $F_4$ is in the set state, the processor 1A determines the actual yaw rate value $\dot{\phi}_c$ so that the actual yaw rate value $\dot{\phi}_c$ equals the yaw rate $\dot{\phi}$ sensed by the yaw rate sensor 8.

Figure 6:
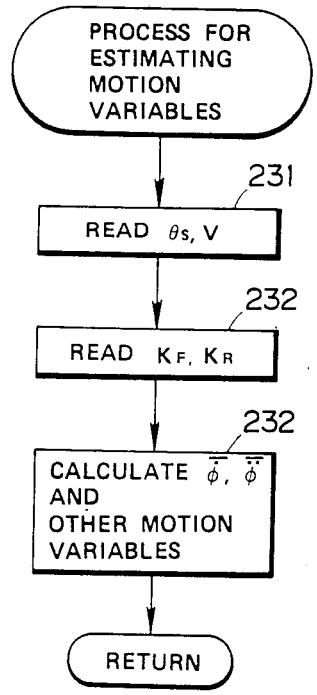

A motion variable estimating process shown in FIG. 6 corresponds to the motion variable estimator section 14. In this process, the processor 1A estimates values of vehicle motion variables corresponding to the steering wheel angle $\theta_s$ sensed by the sensor 2 and the vehicle speed V sensed by the sensor 3 by using a predetermined actual vehicle model.

The actual vehicle model is a simulation model which is determined by a set of vehicle characterizing parameters, and equations of motion, and designed so that for given values of the steering wheel angle $\theta_s$ and the vehicle speed V, it is possible to obtain values of the motion variables corresponding to the given values of $\theta_s$ and V. For example, the actual vehicle model is determined by actual values of the vehicle characterizing parameters of the controlled vehicle so as to represent the controlled vehicle itself. The set of the vehicle characterizing parameters includes at least the front wheel cornering power parameter $K_F$ and the rear wheel cornering power parameter $K_R$, as shown at a step 232. The processor 1A determines at least the estimated yaw rate value $\bar{\phi}$ and the estimated yaw acceleration value $\bar{\ddot{\phi}}$ by using the actual vehicle model at a step 233.

Figure 7A:
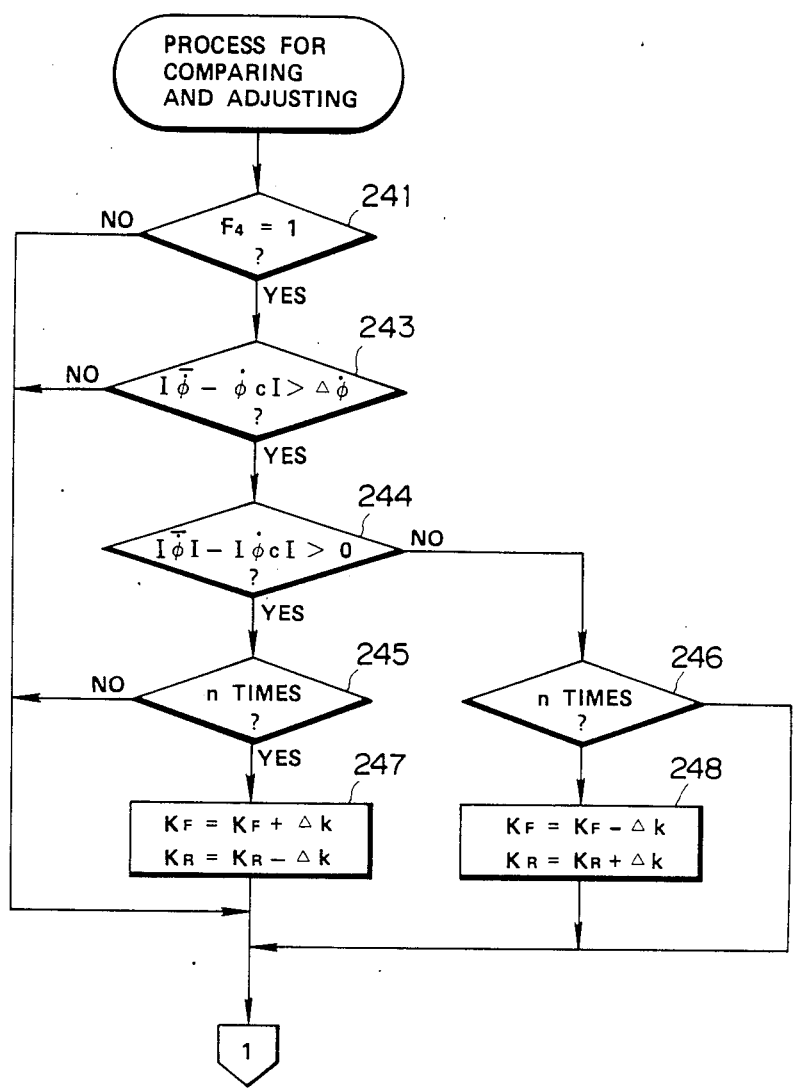
Figure 7B:
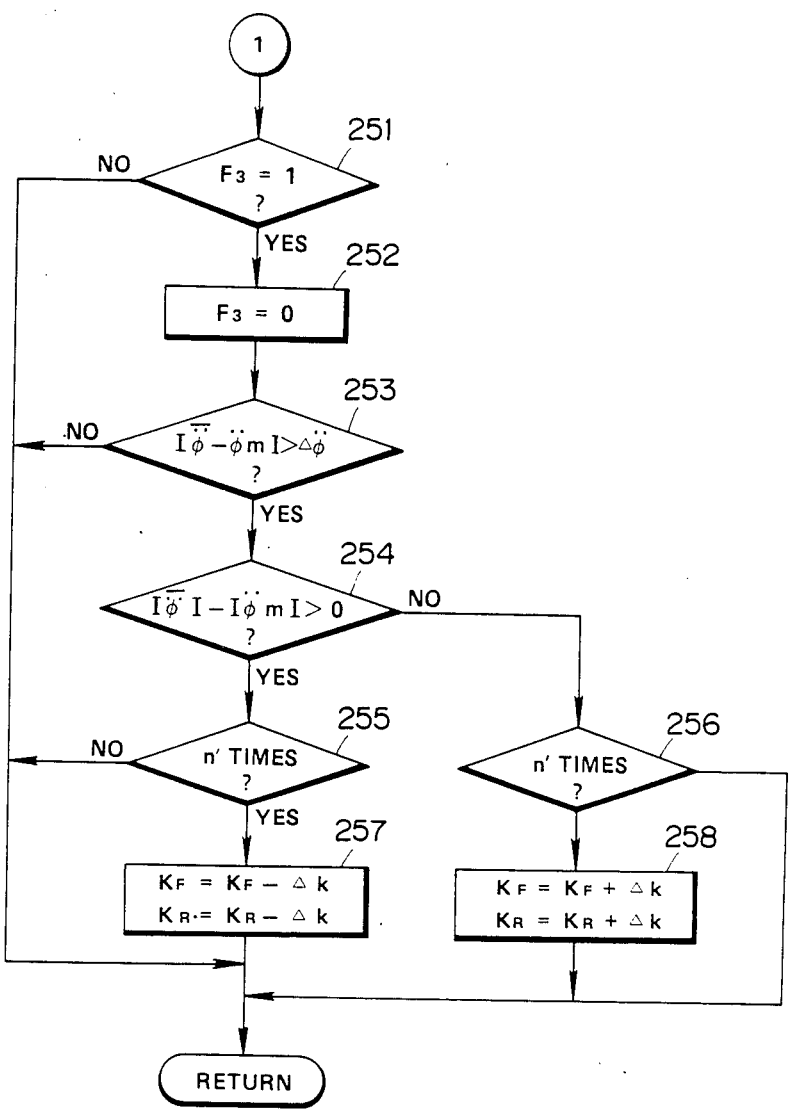

A comparing and adjusting process shown in FIGS. 7A and 7B corresponds to the comparator sections 15 and 16 and the adjuster sections 17 and 18 shown in FIG. 1. In this process, the processor 1A adjusts the values of the front wheel and rear wheel cornering power parameters $K_F$ and $K_R$ used in determining the estimated values of the motion variables by using the actual vehicle model, in order to improve the accuracy of the estimated values of the motion variables.

The proccesor 1A performs either of a routine consisting of steps 241 to 248 and a routine consisting of steps 251 and 258 which is selected in accordance with the flags $F_3$ and $F_4$.

If the vehicle is in the transient state motion, the transient flag $F_3$ is set in the steering condition discriminating process shown in FIG. 2 (, and the steady state motion flag $F_4$ is in the reset state). Accordingly, the processor 1A performs the routine of the steps 251–258 once. In this routine, the processor 1A determines that the flag $F_3$ equals one at the step 251, and then resets the flag $F_3$ to zero at the step 252. Therefore, the processor 1A does not enter the routine of the steps 252 to 258 again until the vehicle comes again into the transient state motion to set the transient flag $F_3$.

Immediately after the vehicle has changed its motion state from a rectilinear motion to a turning motion, a cornering force is produced in the front wheels, and this produces the yaw acceleration of the vehicle. In this case, the yaw acceleration produced for a given value of the steering wheel angle becomes greater as the front wheel cornering force becomes greater.

In view of this, the system of the present invention is arranged to adjust the transient state characteristics of the vehicle model in accordance with the result of a comparison between the actual yaw acceleration value $\ddot{\phi}_m$ and the estimated yaw acceleration value $\bar{\ddot{\phi}}$.

Accordingly, the processor 1A determines whether the absolute value of the estimated yaw acceleration value $|\bar{\ddot{\phi}}|$ is greater than the absolute value of the actual yaw acceleration value $|\ddot{\phi}_m|$ at the step 254. If the absolute value of the estimated yaw acceleration value $|\bar{\ddot{\phi}}|$ is greater than the absolute value of the actual yaw acceleration valve $|\ddot{\phi}_m|$, the processor 1A decreases the front wheel cornering power parameter $K_F$ of the actual vehicle model at the step 257. If the absolute value of the estimated yaw acceleration value $|\bar{\ddot{\phi}}|$ is smaller than the absolute value of the actual yaw acceleration value $|\ddot{\phi}_m|$, the processor 1A increases the front wheel cornering power parameter $K_F$ of the vehicle model at the step 258. In order to adjust only the transient state characteristics of the actual vehicle model without affecting the steady state understeer/oversteer characteristics of the actual vehicle model, the processor 1A of this embodiment decreases the rear wheel cornering power parameter $K_R$ of the actual vehicle model simultaneously with the front wheel cornering power parameter at the step 257, and increases the rear wheel cornering power parameter $K_R$ of the actual vehicle model simultaneously with $K_F$ at the step 258.

The steps 253, 255 and 256 are interposed in order to improve the reliability of the judgement. At the step 253, the processor 1A determines whether a deviation between the estimated and actual yaw acceleration values $\bar{\ddot{\phi}}$ and $\ddot{\phi}_m$ is greater than a predetermined value $\Delta \ddot{\phi}$, in order to determine whether the adjustment of $K_F$ and $K_R$ is necessary or not. The processor 1A further examines the necessity of the adjustment by determining whether the affirmative answer of the step 254 is obtained n' times consecutively at the step 255 or by determining whether the negative answer of the step 254 is obtained n' times consecutively at the step 256.

If the vehicle is in the steady-state turning motion, the steady-state motion flag $F_4$ is set in the steady-state turning motion discriminating process shown in FIG. 4 (, and the transient state motion flag $F_3$ is reset). Therefore, the processor 1A enters the routine of the steps 241 to 248. In accordance with the result of the comparison between the actual yaw rate value $\dot{\phi}_c$ and the estimated yaw rate value $\bar{\dot{\phi}}$, the processor 1A adjusts the parameters characterizing steady-state understeer/oversteer in steady-state motion.

At the step 244, the processor 1A determines whether the absolute value of the estimated yaw rate value $|\bar{\dot{\phi}}|$ is greater than the absolute value of the actual yaw rate value $|\dot{\phi}_c|$. If the absolute value of the estimated yaw rate value $|\bar{\dot{\phi}}|$ is greater than the absolute value of the actual yaw rate value $|\dot{\phi}_c|$, the processor 1A considers that the front wheels are slipping outwardly during a turn, and therefore, increases the front wheel cornering power parameter $K_F$ and decreases the rear wheel cornering power parameter $K_R$ at the step 247. As a result, the steady-state steer characteristics of the actual vehicle model is adjusted toward oversteer.

If the absolute value of the estimated yaw rate value $|\bar{\dot{\phi}}|$ is smaller than the absolute value of the actual yaw rate value $|\dot{\phi}_c|$, the processor 1A considers that the rear wheels are slipping outwardly during a turn, and therefore, decreases the front wheel cornering power parameter $K_F$ and increases the rear wheel cornering power parameter $K_R$ at the step 248. As a result, the steady-state steer characteristics of the actual vehicle model are adjusted toward understeer.

A stability factor A is given by:

$$A = -\frac{M}{2L^2} \frac{L_F K_F - L_R K_R}{K_F K_R} \qquad (2)$$

The understeer is increased as the stability factor A is increased above zero. At the steps 247 and 248, the processor 1A adjusts the steady-state steer characteristics by varying the quantity $(L_F K_F - L_R K_R)$ appearing in the equation (2). In the equation (2), M is a vehicle mass, L is a wheelbase, $L_F$ is a distance between a front axle and a center of gravity, and $L_R$ is a distance between a rear axle and the center of gravity of the vehicle.

The steps 243, 245 and 246 are interposed in order to improve the reliability of the judgement, like the steps 253, 255 and 256.

In this way, the system of the first embodiment can estimate a plurality of the vehicle motion variables by sensing the two variables, i.e., the steering wheel angle $\theta_s$ and the vehicle speed V, and solving the predetermined actual vehicle model. Therefore, this system can determine values of a number of motion variables with fewer sensors. Furthermore, the system of this embodiment can correct the estimated values of the motion variables by sensing the yaw rate and yaw acceleration, which are easy to measure, and feeding back the sensed yaw rate and yaw acceleration.

Figure 8:
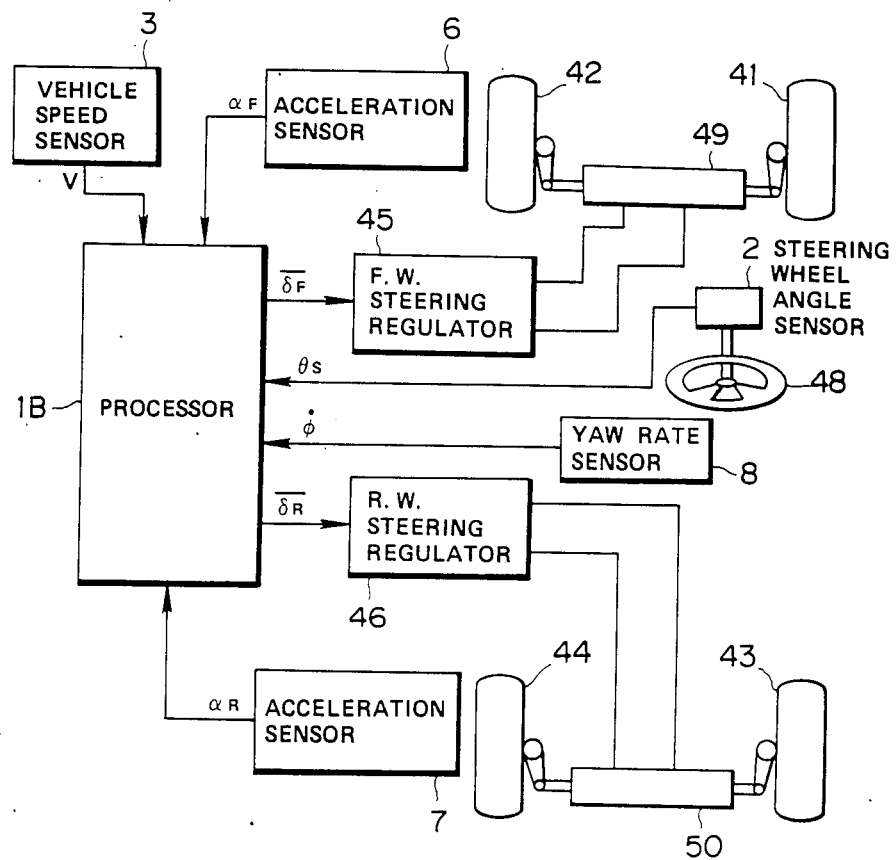
FIG. 8 is a schematic view showing a second embodiment of the invention.

A second embodiment of the present invention is shown in FIG. 8. The system of the second embodiment has two independent vehicle models. A first one is a desired vehicle model representing a desired vehicle having desired cornering characteristics, and a second one is an actual vehicle model representing the controlled vehicle on which the control system of the second embodiment is mounted. The system of the second embodiment estimates the motion variables on the basis of the desired vehicle model, and controls the steer angles of the wheels of the controlled vehicle so that the desired motion variables are produced in the controlled vehicle.

A processor 1B of the second embodiment may take the form of a microcomputer or other electric circuits. The processor 1B is connected with a steering wheel angle sensor 2, a vehicle speed sensor 3, front and rear lateral acceleration sensors 6 and 7, and a yaw rate sensor 8 which are identical, respectively, to those of the first embodiment shown in FIG. 1. The processor 1B processes input data from these sensors, and outputs a desired front wheel steer angle $\bar{\delta}_F$ for front wheels 41 and 42 of the controlled vehicle and a desired rear wheel steer angle $\bar{\delta}_R$ for rear wheels 43 and 44 in the form of control signals.

The front wheel pair and the rear wheel pair are steered, respectively, by hydraulic steering units 49 and 50, which are controlled by a front wheel steering regulator 45 and a rear wheel steering regulator 46, respectively. Each of the steering regulators 45 and 46 receives the corresponding value $\bar{\epsilon}_F$ or $\bar{\epsilon}_R$, and varies the oil pressure supplied to the hydraulic steering unit 49 or 50 in accordance with the desired steer angle so that the actual steer angle of the corresponding wheel pair is maintained equal to the desired steer angle value. The hydraulic steering units and the steering regulators, and their operations are disclosed in a copending U.S. patent application Ser. No. 773,650, filed Sept. 9, 1985 (and a corresponding Japanese patent application No. 59-188153), which disclosure is hereby incorporated by reference.

Figure 9:
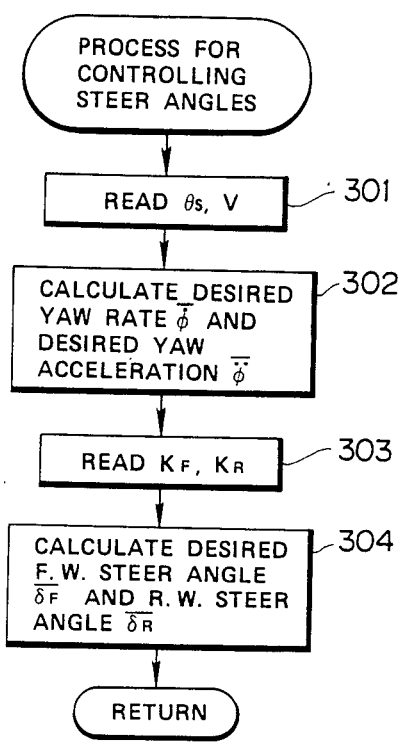
FIG. 9 is a flowchart of a program performed by a processor shown in FIG. 8.

The processes performed by the processor 1B of the second embodiment is different from those of the first embodiment in that the motion variable estimating process of the first embodiment shown in FIG. 6 is replaced by a steer angle controlling process shown in FIG. 9.

At a step 302 of the steer angle controlling process shown in FIG. 9, the processor 1B determines desired values of the yaw rate and yaw acceleration corresponding to the steering wheel angle $\theta_s$ sensed by the sensor 2 and the vehicle speed V sensed by the sensor 3 by using the desired vehicle model. The desired yaw rate value $\bar{\phi}$ and yaw acceleration value $\bar{\ddot{\phi}}$ may be different from the actual values determined from the actual controlled vehicle model.

In the second embodiment, the desired yaw rate value $\bar{\phi}$ and the desired yaw acceleration value $\bar{\ddot{\phi}}$ are desired values determined from the desired vehicle model which the control system of the second embodiment is intended to produce.

At a step 304, the processor 1B determines a value $\bar{\delta}_F$ of the front wheel steer angle and a value $\bar{\delta}_R$ of the rear wheel steer angle required to produce the desired yaw rate $\bar{\phi}$ and yaw acceleration $\bar{\ddot{\phi}}$ determined at step 302 by performing mathematical operations utilizing the characterizing parameters of the actual vehicle model representing the controlled vehicle. The actual yaw rate and yaw acceleration of the controlled vehicle are made equal to the desired yaw rate value $\bar{\phi}$ and yaw acceleration value $\bar{\ddot{\phi}}$, respectively. As determined from the desired vehicle model.

At a step 303, the processor 1B reads the values of the front wheel and rear wheel cornering power parameters $K_F$ and $K_R$ as adjusted by the process shown in FIGS. 7A and 7B. The adjusted values of parameters $K_F$ and $K_R$ are then used in determining the desired front wheel and rear wheel steer angles required to achieve the desired yaw rate and yaw acceleration at the step 304. The processor 1B then delivers control signals indicative of these desired steer angles $\bar{\delta}_F$ and $\bar{\delta}_R$ to the steering regulators 45 and 46, respectively. The front wheel and rear wheel steering regulators 45 and 46 steer the front wheels 41 and 42 or the rear wheels 43 and 44 to the desired steer angle $\bar{\delta}_F$ or $\bar{\delta}_R$ by supplying the oil pressure to the hydraulic unit 49 or 50.

Thus, the system of the second embodiment can endow the controlled vehicle with desired characteristics without changing the actual construction of the controlled vehicle. For example, the system can endow the controlled vehicle of a sedan type with the characteristics of a sports car by using the desired vehicle model representing the sports car.

Figure 10:
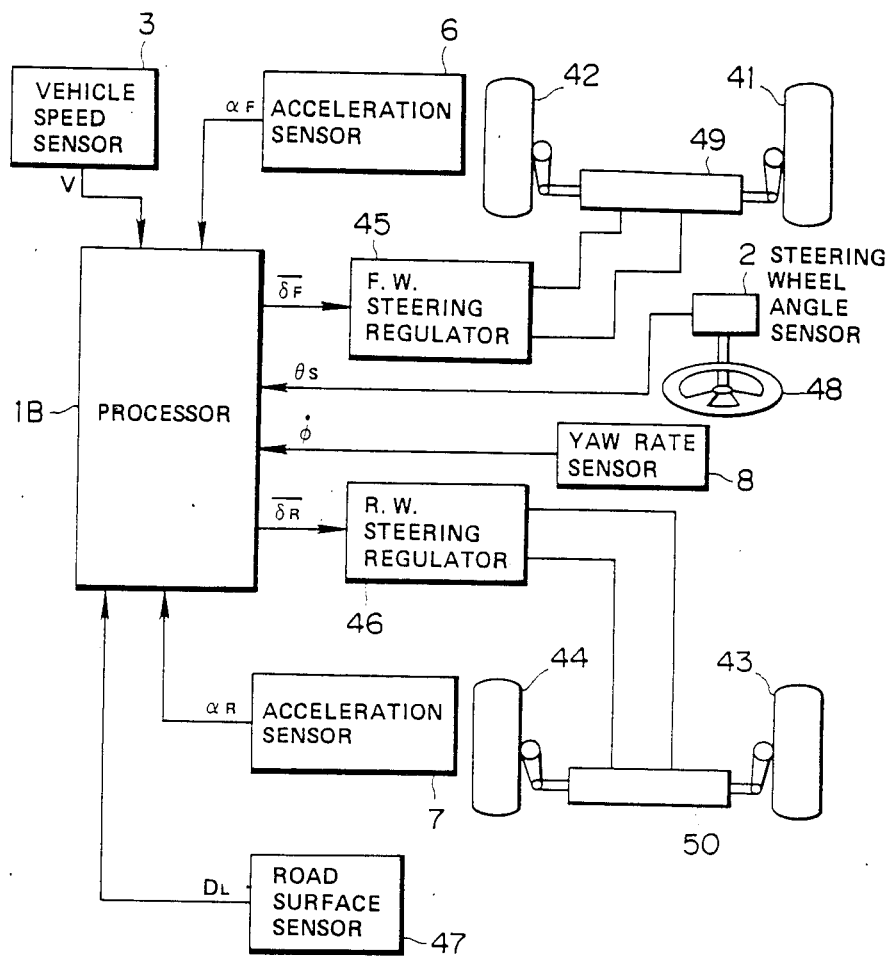
FIG. 10 is a schematic view showing a third embodiment of the invention.

A third embodiment of the present invention is shown in FIG. 10. A system of the third embodiment has a road surface condition sensor 47 for detecting whether a road surface condition is good or bad, in addition to the component parts of the system of the second embodiment shown in FIG. 8. In the third embodiment, the comparing and adjusting process shown in FIGS. 7A and 7B is prohibited when the road surface sensor 47 detects that the road surface is rugged.

Figure 11:
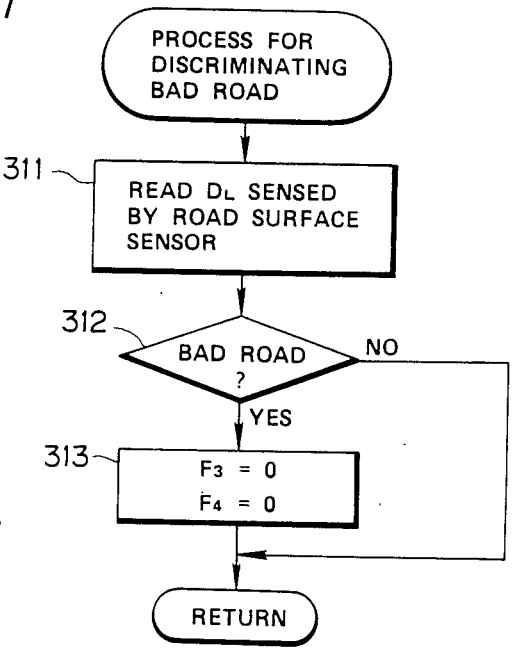
FIG. 11 is a flowchart of a program performed by a processor shown in FIG. 10.

A processor 1C of the third embodiment performs a bad road discriminating process shown in FIG. 11 in addition to the steady-state turning motion discriminating process of FIG. 4, the actual motion variable detecting process of FIG. 5, the comparing and adjusting process of FIGS. 7A and 7B and the steer angle controlling process of FIG. 9.

In the bad road discriminating process, the processor 1C reads a signal (data) $D_L$ produced by the road surface condition sensor 47. At a step 312, the processor 1C determines whether the road surface condition is bad or not, in accordance with the signal $D_L$. If it is bad, the processor 1C resets both of the transient state flag $F_3$ and the steady state flag $F_4$ at a step 313. Therefore, when the controlled vehicle is running on a bad road, execution of the comparing and adjusting process of FIGS. 7A and 7B is prohibited, so that the front wheel and rear wheel cornering power parameters $K_F$ and $K_R$ are not adjusted.

While a vehicle is moving on a bad road, in general, a vertical load acting between each tire and the road fluctuates very widely, so that it is difficult to perform the adjustment in a manner adequate to follow up change in the road surface condition. Accordingly, the system of the third embodiment is arranged to prohibit the parameter adjustment in situations where the reliability of the parameter adjustment is not sufficient.

A pickup of the road surface condition sensor 47 may take the form of a piezoelectric element which is disposed in a mounting portion of a shock absorber or a suspension strut of the vehicle so as to respond to the load of the associated road wheel. In this case, a bad road condition is discriminated from the frequency or the amplitude of the fluctuation of the output signal of the piezoelectric element.

Instead of employing the piezoelectric element, the road surface condition sensor 47 may be arranged to transmit light, ultrasonic waves, microwaves, or the like toward the road surface, and to detect the road surface condition from variation of the intensity of the reflected waves or variation of the time interval between transmission of the energy of the waves and reception of the reflected energy.

The above-mention copending application No. 773,650 discloses in detail desired and actual mathematical vehicle models, various vehicle parameters and various motion variables. The disclosure of this copending application is hereby incorporated by reference.

For example, the processor of the second or third embodiment performs the steps 302 and 304 of FIG. 9, as follows:

At the step 302, the processor uses the following vehicle parameters of the desired vehicle.

$I_{Z1}$ = a yawing moment of inertia of the desired vehicle,
$M_1$ = a vehicle mass of the desired vehicle,
$L_1$ = a wheel base of the desired vehicle,
$L_{F1}$ = a distance between a front axle and a center of gravity of the desired vehicle,
$L_{R1}$ = a distance between a rear axle and the center of gravity of the desired vehicle,
$I_{K1}$ = a moment of inertia about a kingpin of the desired vehicle,
$K_{S1}$ = a steering stiffness of the desired vehicle,
$D_{K1}$ = a viscosity coefficient of a steering system of the desired vehicle,
$\xi_1$ = a trail of the desired vehicle,
$N_1$ = an overall steering (gear) ratio of the desired vehicle,
$K_{F1}$ = a cornering power parameter for each of front wheels of the desired vehicle,
$K_{R1}$ = a cornering power of each of rear wheels of the desired vehicle.

The processor performs operations to determine the desired values of the yaw rate and the yaw acceleration by using the following equations.

$$I_{K1}\ddot{\delta}_{F1} = N_1 K_{S1}(\theta_S - N_1 \delta_{F1} - D_{K1}\dot{\delta}_{F1} - 2\xi_1 C_{F1} \tag{21}$$

$$M_1(\dot{y}_1 + \dot{\phi}_1 V) = 2C_{F1} + 2C_{R1} \tag{22}$$

$$I_{Z1}\ddot{\phi}_1 = 2L_{F1}C_{F1} - 2L_{R1}C_{R1} \tag{23}$$

$$\beta_{F1} = \delta_{F1} - (\dot{y}_1 + L_{F1}\dot{\phi}_1)/V \tag{24}$$

$$\beta_{R1} = -(\dot{y}_1 - L_{R1}\dot{\phi}_1)/V \tag{25}$$

$$C_{F1} = K_{F1}\beta_{F1} \tag{26}$$

$$C_{R1} = K_{R1}\beta_{R1} \tag{27}$$

$$\ddot{\bar{\phi}} = \ddot{\phi}_1 \tag{28}$$

$$\dot{\bar{\phi}} = \dot{\phi}_1 \tag{29}$$

where
$\delta_{F1}$ = a steer angle of the front wheels of the desired vehicle (In this embodiment, the desired vehicle is a two-wheel steering vehicle.),
$\dot{\phi}_1$ = a yaw rate of the desired vehicle,
$\ddot{\phi}_1$ = a yaw acceleration of the desired vehicle,
$\dot{y}_1$ = a side speed of the desired vehicle along its lateral, or Y, axis,
$\ddot{y}_1$ = a side slipping acceleration of the desired vehicle,
$\beta_{F1}$ = a slip angle of the front wheels of the desired vehicle,
$\beta_{R1}$ = a slip angle of the rear wheels of the desired vehicle,
$C_{F1}$ = a cornering force of each of the front wheels of the desired vehicle,
$C_{R1}$ = a cornering force of each of the rear wheels of the desired vehicle,
$\ddot{\bar{\phi}}$ = a desired value of the yaw acceleration,
$\dot{\bar{\phi}}$ = a desired value of the yaw rate.

At the step 304, the processor uses the following vehicle parameters of the controlled vehicle which are preliminary stored in the memory.

$I_{Z2}$ = a yawing moment of inertia of the controlled vehicle,
$M_2$ = a vehicle mass of the controlled vehicle,
$L_2$ = a wheel base of the controlled vehicle,
$L_{F2}$ = a distance between a front axle and a center of gravity of the controlled vehicle,
$L_{R2}$ = a distance between a rear axle and the center of gravity of the controlled vehicle,
$K_{F2}$ = a cornering power parameter for each of the front wheels of the controlled vehicle, which is equal to the adjusted value $K_F$ read at the step 303.
$K_{R2}$ = a cornering power parameter for each of the rear wheels of the controlled vehicle which is equal to the adjusted value $K_R$ read at the step 303.

At the step 304, the processor calculates the desired value $\bar{\delta}_F$ of the front wheel steer angle and the desired value $\bar{\delta}_R$ of the rear wheel steer angle of the controlled vehicle characterizing from the vehicle parameters of the controlled vehicle and the desired value $\ddot{\bar{\phi}}$ of the yaw acceleration and the desired value $\dot{\bar{\phi}}$ of the yaw rate determined in the step 302 by using the following equations.

$$C_{F2} = \frac{1}{2L_2}(M_2 L_{R2} Y_G + I_{Z2}\ddot{\bar{\phi}}) \tag{30}$$

$$C_{R2} = \frac{1}{2L_2}(M_2 L_{F2} Y_G - I_{Z2}\ddot{\bar{\phi}}) \tag{31}$$

$$\beta_{F2} = C_{F2}/K_{F2} \tag{32}$$

$$\beta_{R2} = C_{R2}/K_{R2} \tag{33}$$

$$\bar{\delta}_F = \beta_{F2} + (\dot{y}_2 + L_{F2}\dot{\bar{\phi}})/V \tag{34}$$

$$\bar{\delta}_R = \beta_{R2} + (\dot{y}_2 - L_{R2}\dot{\bar{\phi}})/V \tag{35}$$

$$Y_G = \ddot{y}_2 + \dot{\bar{\phi}}V \tag{36}$$

where
$C_{F2}$ = a cornering force of each of the front wheels of the controlled vehicle,
$C_{R2}$ = a cornering force of each of the rear wheels of the controlled vehicle, $\beta_{F2}$ = a slip angle of the front wheels of the controlled vehicle, $\beta_{R2}$ = a slip angle of the rear wheels of the controlled vehicle, $\dot{y}_2$ = a side speed of the controlled vehicle along its lateral, or Y, axis, $\ddot{y}_2$ = a side acceleration of the controlled controlled vehicle.

What is claimed is:

1. A vehicle motion estimating system comprising:
   means for sensing a steering wheel angle of a controlled vehicle, determining an actual value of said steering wheel angle, and producing a signal indicative of said steering wheel angle,
   means for sensing a vehicle speed of said controlled vehicle, determining an actual value of said vehicle speed, and producing a signal indicative of said speed,
   means for sensing a first motion variable of said controlled vehicle, determining an actual value of said first motion variable, and producing a signal indicative of said first motion variable,
   means for sensing a second motion variable of said controlled vehicle, determining an actual value of said second motion variable, and producing a signal indicative of said second motion variable, and
   processing means, with inputs receiving the signals produced by said steering wheel angle sensing means, vehicle speed sensing means and first and second motion variable sensing means, for estimating from said signals at least a third variable defining a motion of said controlled vehicle, said processing means comprising state discriminating means for producing a condition signal which is in a first signal state when said controlled vehicle is in a steady state turning motion and in a second signal state when said controlled vehicle is in transient state turning motion, motion estimating means for determining estimated values of said first, second and third variables corresponding to the signals indicative of said actual values of said steering wheel angle and vehicle speed by solving at least a first mathematical vehicle model which is determined by equations of vehicle motion and values of a group of vehicle characterizing parameters comprising a first vehicle characterizing parameter, and parameter adjusting means for adjusting the value of said first vehicle characterizing parameter used in determining said estimated value of said third variable in accordance with a result of a comparison between said actual and estimated values of said first motion variable when said condition signal is in said first signal state, and in accordance with a result of a comparison between said actual and estimated values of said second motion variable when said condition signal is in said second signal state.

2. A system according to claim 1 wherein said first motion variable is a yaw rate, said second motion variable is a yaw acceleration, and said group of said vehicle characterizing parameters comprises a front wheel cornering power parameter and a rear wheel cornering power parameter, said parameter adjusting means adjusting the values of both of said front and rear wheel cornering power parameters.

3. A system according to claim 2 wherein said state discriminating means discriminates said transient state turning motion by monitoring said actual value of said steering wheel angle, and discriminates said steady state turning motion by monitoring said actual values of said vehicle speed and first and second motion variables.

4. A system according to claim 3 wherein said parameter adjusting means decreases said front and rear wheel cornering power parameters if the absolute value for said estimated value of said yaw acceleration is greater than the absolute value of said actual value of said yaw acceleration, and increases said front and rear wheel cornering power parameters if the absolute value of said estimated value of said yaw acceleration is smaller than the absolute value of said actual value of said yaw acceleration on condition that said condition signal is in said second signal state, and wherein said parameter adjusting means increases said front cornering power parameter and decreases said rear cornering power parameter if the absolute value of said estimated value of said yaw rate is greater than the absolute value of said actual value of said yaw rate, and decreases said front cornering power parameter and increases said rear cornering power parameter if the absolute value of said estimated value of said yaw rate is smaller than the absolute value of said actual value of said yaw rate, on condition that said condition signal is in said first signal state.

5. A system according to claim 4 wherein said first motion variable sensing means comprises a yaw rate sensor mounted on said controlled vehicle, and said second motion variable sensing means comprises a front acceleration sensor mounted on said controlled vehicle between right and left front wheels for sensing a lateral acceleration of said front wheels, and a rear acceleration sensor mounted on said controlled vehicle between right and left rear wheels for sensing a lateral acceleration of said rear wheels, said processing means further comprising actual motion variable determining means for determining said actual value of said yaw acceleration by dividing a difference between said lateral acceleration of said front wheels and said lateral acceleration of said rear wheels by a wheelbase of said controlled vehicle.

6. A system according to claim 5 wherein said state discriminating means brings said condition signal to said second signal state if the absolute value of said actual value of said steering wheel angle is greater than a predetermined angle, and at the same time the absolute value of a time rate of change of said actual value of said steering wheel angle is greater than a predetermined rate.

7. A system according to claim 6 wherein said first mathematical vehicle model is determined by actual values of said vehicle characterizing parameters of said controlled vehicle, and said motion estimating means determines not only said estimated values of said first and second motion variables but also said estimated value of said third variable by solving only said first vehicle model.

8. A system according to claim 7 wherein said third variable is a side slip angle of said controlled vehicle.

9. A system according to claim 7 wherein said third variable is one of a front wheel cornering force and a rear wheel cornering force of said controlled vehicle.

10. A system according to claim 7 wherein said third variable is a roll angle of said controlled vehicle.

11. A system according to claim 6 wherein said third variable is one of a front wheel steer angle and a rear wheel steer angle, and said motion estimating means determines said estimated values of said first and second motion variables by solving said first mathematical vehicle model which is determined by desired values of said vehicle characterizing parameters to represent a desired vehicle, and determines said estimated value of said third variable corresponding to said estimated values of said first and second motion variables and said actual values of said steering wheel angle and vehicle speed by solving a second mathematical vehicle model which is determined by actual values of said vehicle characterizing parameters of said controlled vehicle to represent said controlled vehicle.

12. A system according to claim 11 further comprising means for sensing a road surface condition for sensing a predetermined adverse condition of a road surface under said controlled vehicle, and wherein said condition signal produced by said state discriminating means is in a third signal state when said adverse condition is sensed by said road surface condition sensing means, and said parameter adjusting means is prevented from adjusting said actual values of said front wheel cornering power parameter and said rear wheel cornering power parameter when said condition signal is in said third signal state.

13. A steering control system for a controlled vehicle having a pair of first wheels and a pair of second wheels, comprising:
- means for sensing a steering wheel angle of said controlled vehicle, determining an actual value of said steering wheel angle, and producing an output signal indicative of said steering wheel angle,
- means for sensing a vehicle speed of said controlled vehicle, determining an actual value of said vehicle speed, and producing an output signal indicative of said vehicle speed,
- means for sensing a first motion variable of said controlled vehicle, determining an actual value of said first motion variable, and producing an output signal indicative of said first motion variable,
- means for sensing a second motion variable of said controlled vehicle, determining an actual value of said second motion variable, and producing an output signal indicative of said motion variable,
- processing means with inputs receiving the signals produced by each of said sensing means, said processing means comprising state discriminating means for producing a condition signal from said sensing means signals which is in a first signal state when said controlled vehicle is in a steady-state turning motion and in a second signal state when said controlled vehicle is in a transient state turning motion, estimating means for determining from said sensing means signals estimated values of said first and second motion variables corresponding to said actual values of said steering wheel angle and vehicle speed by solving a mathematical desired vehicle model and further determining at least a desired value of a first wheel steer angle for said first wheels corresponding to said estimated values of said first and second motion variables and said actual values of said steering wheel angle and vehicle speed by solving a mathematical actual vehicle model determined by actual values of a first vehicle characterizing parameter and other vehicle characterizing parameters of said controlled vehicle, and parameter adjusting means for adjusting the value of said first vehicle characterizing parameter used in said actual vehicle model in accordance with a result of a comparison between said actual and estimated values of said first motion variable when said condition signal is in said first state and in accordance with a result of a comparison between said actual and estimated values of said second motion variable when said condition signal is in said second state, and
- actuating means for steering at least the pair of said first wheels in accordance with said desired value of said first wheel steer angle.

* * * * *